(12) United States Patent
Willars et al.

(10) Patent No.: US 6,449,290 B1
(45) Date of Patent: Sep. 10, 2002

(54) METHODS AND ARRANGEMENTS IN A RADIO COMMUNICATIONS SYSTEM

(75) Inventors: Per Hans Åke Willars, Stockholm; Karl Anders Näsman, Solna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/096,171

(22) Filed: Jun. 12, 1998

(30) Foreign Application Priority Data

Jun. 13, 1997 (SE) .............................................. 9702273

(51) Int. Cl.[7] .................................................. H04J 3/06
(52) U.S. Cl. ........................ 370/507; 370/324; 370/350; 370/509; 370/512; 370/516; 375/356; 455/13.2
(58) Field of Search .................................. 370/312, 320, 370/324, 331, 335, 342, 441, 479, 503, 507, 509, 512, 516, 517, 350, 337, 508; 375/356, 357, 354, 355; 455/13.2, 436

(56) References Cited

U.S. PATENT DOCUMENTS

| 4,894,823 | A | | 1/1990 | Adelmann et al. ............ 370/60 |
| 5,450,394 | A | | 9/1995 | Gruber et al. ................. 370/17 |
| 5,627,830 | A | * | 5/1997 | Kotzin ........................ 370/350 |
| 5,872,820 | A | | 2/1999 | Upadrasta .................... 370/509 |
| 5,889,781 | A | * | 3/1999 | Eftimakis et al. ............ 370/509 |
| 6,088,602 | A | * | 7/2000 | Banister ...................... 370/335 |
| 6,243,372 | B1 | * | 6/2001 | Petch et al. .................. 370/503 |

FOREIGN PATENT DOCUMENTS

| EP | 0 437 835 | 7/1991 | ............ H04B/7/26 |
| EP | 0 474 138 | 3/1992 | ............ H04Q/7/04 |
| GB | 2 290 926 | 1/1996 | ............ H04Q/7/38 |
| WO | 94/30024 | 12/1994 | ............ H04Q/7/04 |

* cited by examiner

Primary Examiner—Douglas Olms
Assistant Examiner—Shick Hom
(74) Attorney, Agent, or Firm—Burns, Doane, Swecker & Mathis, L.L.P.

(57) ABSTRACT

Methods and an arrangement for synchronizing communication of framed data via asynchronous base stations (BS1, BS2) in a cellular communication system are presented. The synchronization methods are performed continuously by sending out certain system frame counter states from a central node in the system to all its connected base stations (BS1, BS2). Each base station (BS1, BS2) includes a local frame counter ($LFC_{BS1}$, $LFC_{BS2}$), which generates local frame counter states (t1(1)–t1(4), t2(1)–t2(4)) correlated to the system frame counter states. Transmission of information via the base stations (BS1, BS2) is synchronized by assigning each data frame (DR(1)–DR(4)) a particular frame number, which is given by the local frame counter states (t1(1)–t1(4), t2(1)–t2(4)), so that data framed (DF(1)–DF(4)) having identical numbers contain copies of a certain data packet. Correct frame numbers are derived from common downlink channel offset measurements (CCO1, CCO2) carried out in the base stations (BS1, BS2), and timing advance values (TA2) and downlink channel offsets (DCO1, DCO2) calculated in the central node.

32 Claims, 6 Drawing Sheets

METHODS AND ARRANGEMENTS IN A RADIO COMMUNICATIONS SYSTEM

TECHNICAL FIELD

The present invention relates to a method for synchronising communication of framed data via asynchronous base stations in a cellular communications system, e.g. a CDMA-system (Code Division Multiple Access). The synchronisation method is performed continuously, but in particular at connection establishment and during execution of soft handover.

The invention is also directed to an arrangement for performing the above mentioned method.

STATE OF THE ART

Today there is an increasing interest in using CDMA or spread spectrum systems in commercial applications. Some examples include digital cellular radio, land mobile radio, satellite systems, and indoor and outdoor personal communications networks referred to herein collectively as cellular systems.

CDMA allows signals to overlap in both time and frequency. Thus, CDMA signals share the same frequency spectrum. In the frequency or the time domain, the multiple access signals appear to be on top of each other.

There are a number of advantages associated with CDMA communication techniques. The capacity limits of CDMA-based cellular systems are high. This is a result of the properties of a wide band CDMA system, such as improved interference diversity, voice activity gating, and reuse of the same spectrum in interference diversity.

In principle, in a CDMA system the informational data stream to be transmitted is superimposed upon a much higher rate data stream known as a signature sequence. Typically, the signature sequence data are binary, providing a bit stream. One way to generate this signature sequence is with a PN-process (pseudo-noise) that appears random, but can be replicated by an authorised receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique spreading code. The ratio between the signature sequence bit rate and the information bit rate is called the spreading ratio.

A plurality of coded information signals modulate a radio frequency carrier, for example by QPSK (Quadrature Phase Shift Keying), and are jointly received as a composite signal at a receiver. Each of the coded signals overlaps all of the other coded signals, as well as noise-related signals, in both frequency and time. If the receiver is authorised, then the composite signal is correlated with one of the unique codes, and the corresponding information signal can be isolated and decoded.

In CDMA, also referred to as DS-CDMA (direct sequence-CDMA) to distinguish it from FH-CDMA (frequency hopping-CDMA), the "information bits" referred to above can also be coded bits, where the code used is a block or convolutional code. One or more information bits can form a data symbol. Also, the signature sequence or scramble mask can be much longer than a single code sequence, in which case a sub-sequence of the signature sequence or scramble mask is added to the code sequence.

In a CDMA cellular communications system, each cell has several modulator-demodulator units or spread spectrum modems. Each modem consists of a digital spread spectrum transmit modulator, at least one digital spread spectrum data receiver and a searcher receiver. Each modem at the base station BS can be assigned to a mobile station as needed to facilitate communications with the assigned mobile station MS. In many instances many modems are available for use while other ones may be active in communicating with respective mobile stations. A soft handover scheme is employed for a CDMA cellular communications system in which a new base station modem is assigned to a mobile station while the old base station modem continues to serve the call. When the mobile station is located in the transition region between the two base stations, it communicates with both base stations. Similarly, if one base station is responsible for more than one geographical sector handover may be carried out between different sectors belonging to the same base station.

When mobile station communications are established with a new base station or a new sector, for instance, the mobile station has good communications with the new cell or sector, the old base station/modem discontinues serving the call. This soft handover is in essence a make-before-break switching function. The mobile station determines the best new base station, or sector, to which communications are to be transferred to from an old base station, or sector. Although it is preferred that the mobile station initiates the handover request and determines the new base station, handover process decisions may be made as in conventional cellular telephone systems wherein the base station determines when a handover may be appropriate and, via the system controller, request neighbouring cells, or sectors, to search for the mobile station signal. The base station receiving the strongest signal as determined by the system controller then accepts the handover.

In the CDMA cellular communications system, each base station normally transmits a pilot carrier signal in each of its sectors. This pilot signal is used by the mobile stations to obtain initial system synchronisation and to provide robust time, frequency and phase tracking of the base station transmitted signals during a so called air interface chip synchronisation phase. The RNC (Radio Network Control node) maintains its synchronisation with the PSTN (Public Switched Telephone Network).

An active set for a specific mobile station is a listing of sectors via which the mobile station communicates. Adding and/or dropping sectors from the active set is called an ASU (active set update). Thus, a regular handover from a first base station (serving a first sector) to a second base station (serving a second sector) can be defined as the active set before handover containing only the first sector and after the handover containing only the second sector. Handover from the first to the second base station may, of course, also be defined as the active set originally containing several sectors i.a. the first sector, but not the second sector and after handover the active set containing several sectors i.a. the second sector, however not the first sector. Furthermore a handover may be performed either between identical frequencies, a so called intra radio frequency handover (intra RF-HO) or between different frequencies, a so called inter radio frequency handover (inter RF-HO). The exact definition of handover is nevertheless irrelevant for the present application, since the invention only concerns active set update and in particular adding one or more sectors to the active set.

The active set. may also be different for the up- and the downlink connection for a particular mobile station. For instance, it is possible that the active set contains many different sectors of one and the same base station for the uplink and only one of these sectors for the corresponding downlink connection.

During macro diversity the active set contains sectors, which are served by more than one base station. Macro diversity must be used during a soft handover, while a hard handover implicates that the active set never contains more than one sector during the procedure.

Radio frequency synchronisation is accomplished through detection and selection of a particular chip sequence, which is associated with the strongest radio frequency carrier received by the mobile station. This allows identification of the "best serving" base station. Said chip sequence is referenced to a system time that is used, for instance, to set the air interface frame transmit time.

In a CDMA system, overlap of time-slots as in TDMA (Time Division Multiple Access) systems is not a problem since a mobile station transmits continuously, and thus does not need to synchronise to other mobile stations. However, when a mobile station is connected to more than one base station in macro-diversity, there is a need to synchronise the base stations in the downlink (also known as the forward link).

Macro-diversity in a CDMA system can be achieved with synchronised base stations. The base stations are usually synchronised with all base station's digital transmissions being referenced to a common CDMA system-wide time scale that uses the GPS (Global Positioning System) time scale, which is traceable to and synchronous with UTC (Universal Coordinated Time). The signals from all the base stations are transmitted at the same instant.

In order to enable macro-diversity, the base stations can be synchronised as described above through a common time reference; GPS. Therefore, the signals transmitted from the base stations are synchronised in time. However, due to different propagation delays in the links, the signals arrive at different time instants at the mobile station. Normally in CDMA systems a rake receiver is used to handle time dispersion and the macro-diversity can be seen as time dispersion from the receivers point-of-view. The principle of the rake receiver is to collect the energies from different paths and combine them before a bit-decision is made.

Methods for continuously monitoring parameters of delay between two nodes in an ATM or frame relay network are known from U.S. Pat. No. 5,450,394. Special measurement cells contain a time stamp indicating the time a cell is sent and a delay value, which indicates a difference between reception and transmission times.

The document U.S. Pat. No. 4,894,823 discloses an alternative method for time stamping data packets, which are transmitted through a fixed communications network. Delays experienced by the data packets in network nodes are measured by inserting an originate time value in the header of each packet upon entering a node and updating this time value in an exit time stamp function when the packet has been transported through the node.

A method for time alignment of transmissions over downlinks in a CDMA system is disclosed in WO, A1, 94/30024. Signals for a specific cellular call connection are synchronised through firstly, a mobile station measuring the time difference between the connected base station's signal and a macro-diversity candidate base station's signal. This measurement is secondly transmitted to the network, which finally compensates for the difference and synchronises the base stations so that a handover may be performed where no data is lost during the procedure.

U.S. Pat. Nos. 5,450,394 and 4,894 823 provide solutions for estimating transmission delays in framed data communications systems. However, the documents do not teach how to achieve synchronised communication between multiple base stations and a specific mobile station in spite of these delays.

According to WO, A1, 94/30024 a method is known for accomplishing time alignment of transmissions over downlinks in a CDMA system. Nevertheless, there is no solution to how these transmissions should be controlled when the delay differences between signals transmitted from different base stations exceed the duration of one half data frame.

DISCLOSURE OF THE INVENTION

An object of the present invention is thus to minimise the synchronisation error between information frames which are sent to a specific mobile station from two or more asynchronous base stations or sectors. By asynchronous is here meant that a phase difference is permitted between signals transmitted from at least two different base stations and that the clock units in different base stations are not locked to each other.

Another object of the invention is to avoid having to rely on an external time reference receiver in each asynchronous base station in order to meet the synchronisation requirements during update of the active set for a mobile station.

Another object of the invention is to minimise the need for buffering in asynchronous base stations which simultaneously receive information frames from a specific mobile station.

A further object of the invention is to relax the buffering needs in mobile stations and thereby reduce the complexity of the mobile stations.

Yet a further object of the invention is to minimise the average round-trip delay experienced in a cellular radio communications system and in a CDMA communications system in particular. By round-trip delay is here meant the total time it takes (on average) for a hypothetical message to be sent from one end point of a connection to the other and back again.

These objects are met by the present invention by generating certain system frame counter states in a central node in the system—a radio network control node—being connected to one or more base stations. Corresponding local frame counter states are generated in each base station in the system. A current sample of the system frame counter state is regularly sent out from the radio network control node to its connected base stations, in order to synchronise each local frame counter with the system frame counter state, which functions as a frame numbering reference within the cellular radio communications system.

According to one aspect of the present invention there is provided a method to regularly send a system frame counter state from a central node to its connected base stations. Each of the base stations adjust their local frame counter states, so that they are all aligned with the system frame counter state. Synchronisation of data packets being communicated via the base stations is then accomplished by sending one data packet per data frame, which is numbered in accordance with a frame counter state. The frame counter states are in the uplink leg of a connection generated locally in each base station and in the downlink leg of the connection, the frame counter states are derived from the system frame counter states in the central node, which is typically a radio network control node.

The above method is hereby characterised by what is apparent from claim 1.

According to another aspect of the present invention there is provided a method for establishing a connection between a particular mobile station and at least one base station, which is based on the synchronisation method above. First, an active set, comprising at least one downlink and one uplink channel, is defined for the mobile station. The base station(s) at which such channels shall be allocated, is(are) determined by pilot signal strength measurements performed by the mobile station. Generally, all sectors whose pilot signal strength value exceeds a predetermined threshold are candidates for the active set. Nevertheless, a downlink channel need not necessarily be allocated in all those sectors and no more than one uplink channel need ever to be allocated. Second, a timing advance value is set for each downlink channel in the active set. The timing advance value specifies an offset between a common downlink control channel for the sector and the downlink channel in question, and is chosen to a value which results in the most uniform distribution of the transmission load on the network and radio resources in the system, in respect to the connections already in progress. Each base station measures, at regular intervals, a common downlink control channel offset between its local frame counter states and the common downlink control channel for each of its sectors. The results of the measurements are reported to the central node. As a third step, a downlink channel offset is calculated by adding the common downlink control channel offset to the timing advance value. Finally, a specific frame number is assigned to each data frame on each respective downlink channel. The frame number indicates in which data frame a particular data packet, that is received from the central node, shall be transmitted. The data frames are numbered according to following. An initial data frame, starting the downlink channel offset value after the current state of the local frame counter state, is given a frame number equal to the current state of the local frame counter. The local frame counter is, on average, incremented at a tick rate which corresponds to one tick per the duration of a data frame. However, due to adjustments of the local frame counter according to updates from the system frame counter state the local frame counter may temporarily have a tick rate, which is either slightly higher or slightly lower than one tick per the duration of a data frame. Subsequent data frames are allocated frame numbers according to their order in relation to the initial data frame.

A method for establishing a connection according to this aspect of the invention is hereby characterised by what is apparent from claim 10.

According to a further aspect of the present invention there is provided a method for commencing communication, via at least one second sector, with a particular mobile station which is already communicating information via at least one first sector, by utilising the synchronisation method above. First, a frame offset between a downlink channel in the active set and a common downlink control channel of a candidate sector for an ASU is measured by the mobile station. Second, the frame offset value is reported to a central node. Third, the second sector is added to the active set. Fourth, a timing advance value and a downlink channel offset value for a downlink channel in the second sector is calculated. Fifth, the offset between the data frames to be transmitted on the downlink channel in the second sector and the common downlink control channel for this sector is set equal to the timing advance value. Finally, a specific frame number is given to each data frame on the downlink channel in the second sector. This is carried out by assigning an initial data frame, which starting from the local frame counter state in the base station serving the second sector plus the downlink channel offset value, falls within half the duration of a data frame a frame number equal to the following local frame state in the base station serving the second sector. Each subsequent data frame is then allocated an integer incrementation the initial number, which is equal to the order of each respective data frame in relation to the initial data frame.

A method for commencing communication via an additional sector, when already communicating via a first sector, according to this aspect of the invention is hereby characterised by what is apparent from claim 11.

An arrangement according to the invention for communicating framed information in a cellular radio communications system comprises one or more central nodes plus one or more base stations. The central node, which is typically a radio network control node, comprises in its turn a master timing unit, a master control unit and a diversity handover unit. The master timing unit generates system frame counter states, which are sent out to the base stations, that are connected to the central node. The master control is a general control unit for the central node. This unit, for instance, determines when to perform an ASU. Furthermore, it calculates timing advance values and downlink channel offset values, which are utilised when numbering data frames on downlink channels. The diversity handover unit is responsible for handling simultaneous communication with a mobile station, via more than one base station.

The above mentioned arrangement of the invention is hereby characterised by what is apparent from claim 22.

The present invention thus offers a solution for performing an active set update (e.g. in connection with soft handover execution) in a cellular radio communications system comprising asynchronous base stations, without demanding GPS-receivers in any base station.

The proposed solution also ensures synchronisation during connection establishment to an asynchronous base station.

Such small synchronisation errors result in low average round-trip delays in the system and allow the transport connections between the radio network control node and the base stations to be asynchronous, e.g. ATM connections.

It also guarantees that there will be no frame slip errors neither in the downlink nor in the uplink of a connection. Moreover the demands for buffering can be relaxed in the base stations as well as in the mobile stations.

As a consequence of the low buffering demand mobile stations can be made less complex and with simpler rake receivers.

The invention will now be described in further detail with help from the preferred embodiments and with reference to enclosed drawings.

PREFERRED EMBODIMENTS

Figure 1:
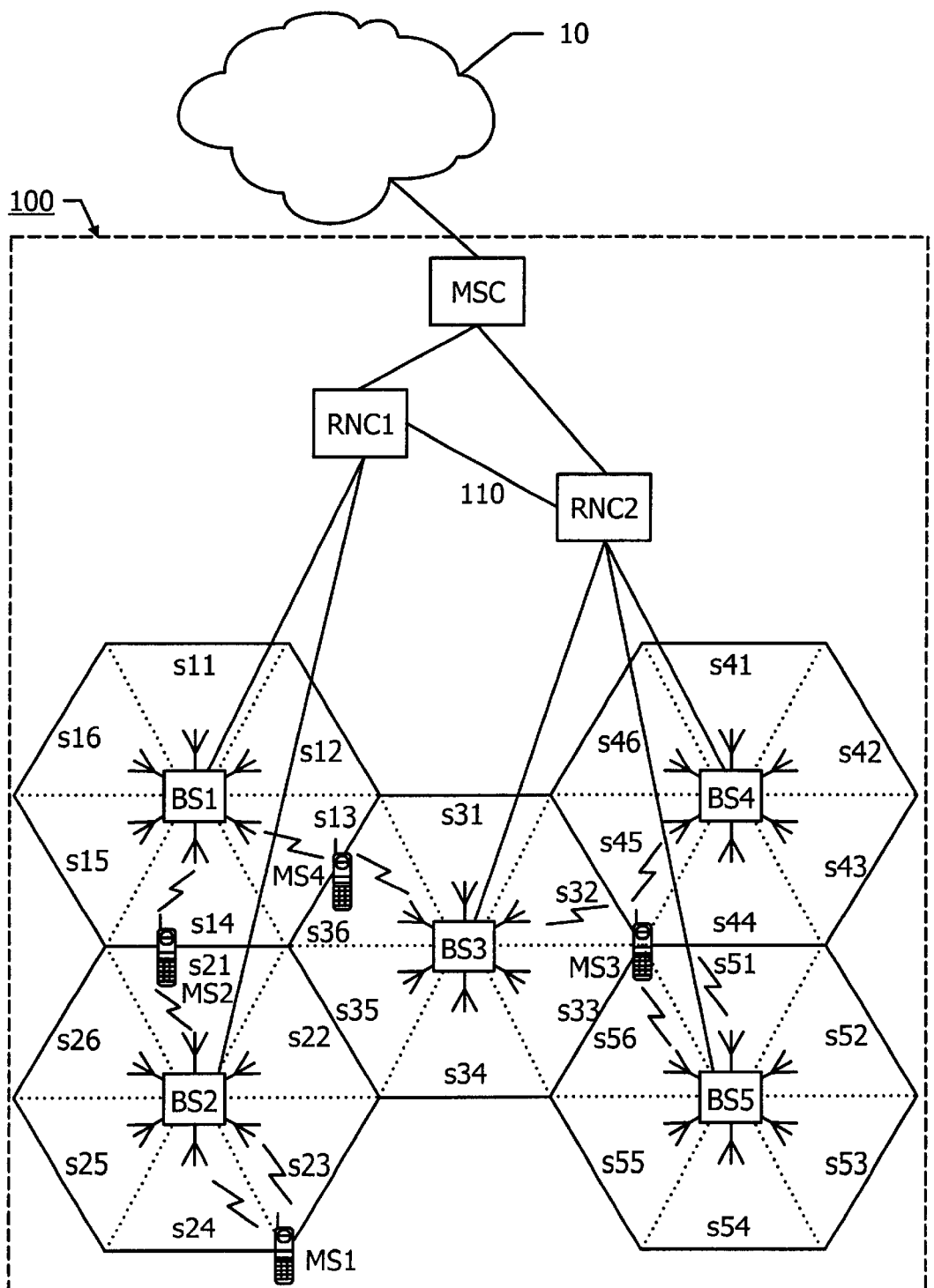
FIG. 1 shows a previously known CDMA cellular radio communications system connected to a fixed communications network.

In FIG. 1 is shown a per se previously known CDMA cellular radio communications system 100 connected to a fixed communications network 10, like for instance the PSTN.

Naturally, the fixed communications network 10 can be any kind of network which is adapted to the type of data being transmitted through the CDMA cellular radio communications system 100. If, say, packet data is communicated in the CDMA system 100, the fixed network 10 is preferably a PSPDN (Packet Switched Public Data Network), a network operating according to IP (Internet Protocol), an ATM-network or a frame relay network.

A node MSC (Mobile services Switching Centre) connects the CDMA cellular radio communications system 100 with the fixed communications network 10. The node MSC may in particular be a so called Gateway Mobile services Switching Centre, if has connection with a communication network outside the CDMA cellular radio communications system 100. The node MSC is via, e.g. ATM-connections, in further contact with radio network control nodes RNC1 and RNC2, which are each connected to one or several base stations BS1, BS2 and BS3–BS5 respectively, through separate ATM-connections. A special connection 110 between the radio network control nodes RNC1 and RNC2 may also be provided, which makes possible to synchronise one radio network control node from the other in a master-slave fashion, e.g. RNC1 being master and RNC2 slave. Alternatively, all radio network control nodes RNC1; RNC2 may be synchronised from the node MSC. Every base station BS1–BS5 is responsible for radio communication in certain geographical areas, so called sectors s11–s16, s21–s26, s31–s36, s41–s46 and s51–s56 respectively.

A certain sector is identified by at least one common downlink control channel, which is distinguished from all other channels in the vicinity through either a specific chip sequence or a specific chip sequence in combination with a particular frequency. A mobile station MS1–MS4 communicates with one or more base stations BS1–BS5 on dedicated channels. The downlink leg of such a connection is setup via at least one downlink channel and the uplink leg is setup via an uplink channel. Each sector s11–s56 generally has its own set of down- and uplink channels. However, the set is adaptive, so that the channels included may be varied. When a mobile station communicates with base stations via more than one sector it must thus tune in more than one downlink channel for decoding the data being received.

A first mobile station MS1 is initially communicating with a base station BS2 in a sector s24. The transmission of data packets between the mobile station MS1 and the base station BS2 is synchronised by a first radio network control node RNC1. When the mobile station MS1 approaches a different sector s23 the measured pilot signal for this sector s23 grows strong enough for the sector s23 to become a candidate for an ASU (Active Set Update). I.e. communication will be started between the mobile station MS1 and the base station BS2 via sector s23. The mobile station MS1 measures a frame offset value between its current downlink channel in sector s24 and the common downlink control channel in sector s23. The result of this measurement is then, via the base station BS2, reported to the radio network control node RNC1, where a timing advance value is calculated. The timing advance value is used for synchronising a downlink channel in sector s23 with the downlink channel used by the mobile station MS1 in sector s24. After having synchronised the two downlink channels, the active set for the connection with the mobile station MS1 is updated and communication is initiated with the base station BS2 via sector s23.

Possibly, the communication via sector s24 is disconnected before communication via sector s23 is ended. However, this need not be the case if, for instance, the mobile station MS1 again approaches sector s24. It is then, on the contrary, more likely that the communication via sector s23 is disconnected first.

A second mobile station MS2 establishes a connection with a base station BS1 in sector s14. The second mobile station MS2 regularly performs frame offset and pilot strength measurements for neighbouring sectors to sector s14 and reports the result of these measurements to the radio network control node RNC1, via the base station BS1. When a pilot strength measurement indicates that the communication can be more effectively carried out via another sector s21, and therefore should be continued there, a downlink channel in sector s21 will thus readily be synchronised with the mobile station's MS2 current downlink channel in sector s14. However, the sector s21 is served by a base station BS2 different from the base station BS1 serving sector s14. The synchronisation between downlink channels in the sectors s14 and s21 is also achieved by calculating a timing advance value in the radio network control node RNC1. The active set for the mobile station MS2 is updated from the radio network control node RNC1 and the communication is continued in the sector s21. The communication via the sector s14 may or may not be maintained, depending on which pilot strength value the mobile station MS2 measures for the sector s21 in relation to a predetermined threshold value, at which an ASU is performed.

Of course, a mobile station MS3 may likewise maintain simultaneous communication via more than two sectors, for instance, s32, s45, s51 and s56, which are served by more than two base stations BS3–BS5. In such a case, where all the base stations BS3–BS5 are connected to the same radio network control node RNC2, synchronisation of the downlink channels used for-the communication can be accomplished according to the method described above. The exact sequence in which communication is started and ended via each respective sector s32, s45, s51 and s56 is irrelevant for how synchronisation is carried out and is only a consequence of pilot strength measurements in relation to the predetermined threshold value for performing an ASU. Thus, the mobile station MS3 may be communicating via all sectors s32, s45, s51 and s56 during a part of the call, during the entire call or periodically via just one or more sectors in any combination thereof.

If a pilot signal strength measurement, reported by a mobile station MS4, indicates that communication should be initiated via a base station BS3, which is connected to a radio network control node RNC2 different from the radio network control node RNC1, which the base station BS1 currently used, is connected to, then it is essential that the radio network control nodes RNC1; RNC2 involved are synchronised with each other, in order to achieve synchronisation of the downlink channels. Such synchronisation demands a central time reference. This can be accomplished in a number of alternative ways. One way is to locate a reference time generator in each of the radio network control nodes RNC1; RNC2, which sees to it that the synchronisation signals generated by all radio network control nodes RNC1; RNC2 in the cellular radio communications system 100 are in phase with each other. Another way is to have some (or all) radio network control nodes RNC1; RNC2 synchronised in a master-slave fashion from a central node in the system 100, like for instance the gateway mobile services switching centre GMSC or a specific master-radio network control node. The reference time generator is preferably constituted by a GPS-receiver, but it may of course be any device for indicating the time, which has sufficient accuracy, such as e.g. an atomic clock.

Figure 2:
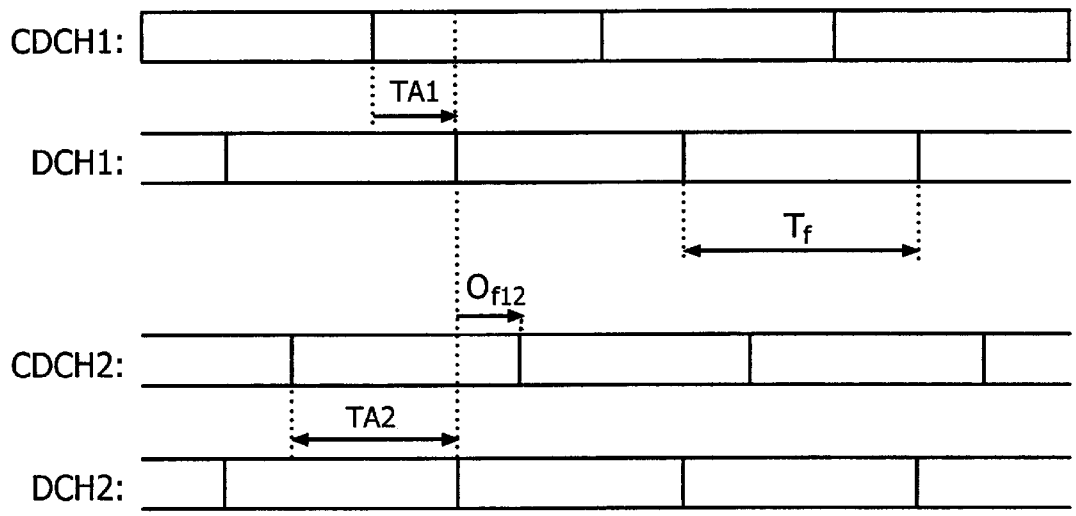
FIG. 2 illustrates a previously known method for air interface synchronisation.

In FIG. 2 is illustrated a previously known method for air interface synchronisation in relation to ASU. A mobile station in a first sector is communicating framed data on a first downlink channel DCH1, e.g. receives data packets in data frames in a synchronised way. The first downlink channel DCH1 has a first timing advance value TA1 to a first common downlink control channel CDCH1.

When a measured pilot signal strength value indicates that an ASU should be performed the mobile station is instructed by a radio network control node to measure a frame offset $O_{f12}$ between its current downlink channel DCH1 and a second common downlink control channel CDCH2 for a second sector, which is a candidate for the active set. The measured frame offset value of $O_{f12}$ is reported to the radio network control node, which calculates a second timing advance value TA2 by subtracting the frame offset value $O_{f12}$ from the duration $T_f$ of a data frame, i.e. TA2=$T_f$-$O_{f12}$. After that, the second timing advance value TA2 is set for communication on a second dedicated channel DCH2 in the second sector. Thus, having achieved synchronisation ASU is performed. ASU means, in this case, that the second sector is added to the active set after which communication is started on the second dedicated channel DCH2.

Figure 3:
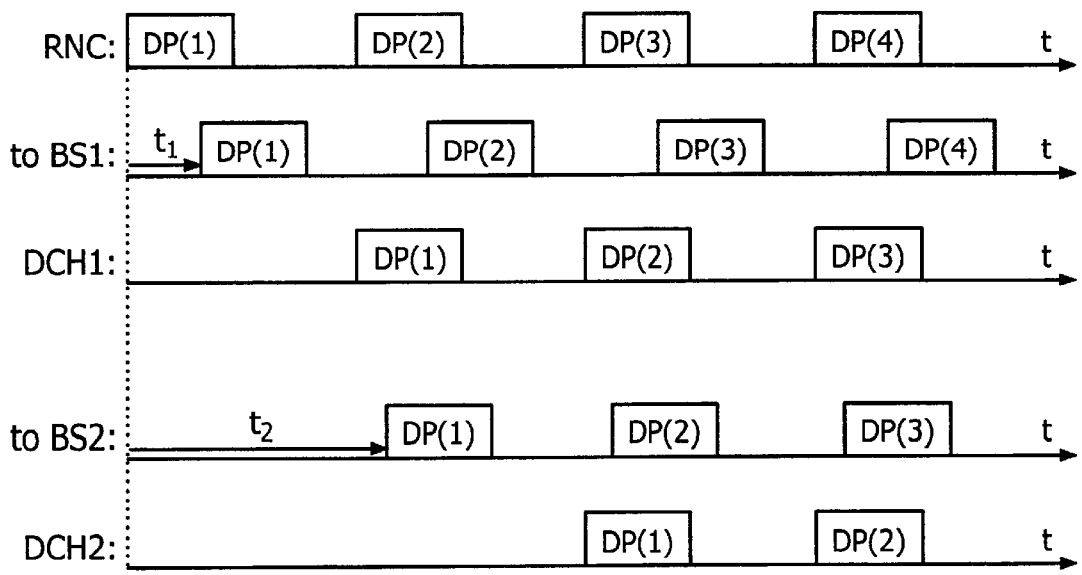
FIG. 3 elucidates a frame slip problem which may occur in the method visualised in FIG. 2.

FIG. 3 shows timing aspects of a known solution, where a set of data packets DP(1)–DP(4) are sent from a radio network control node RNC to a first and a second base station BS1 and BS2 respectively. A first copy of set of data packets DP(1)–DP(4) arrives at the first base station BS1 after a first transmission time $t_1$ and are subsequently sent on a first downlink channel DCH1 to a specific mobile station. A second copy of the set of data packets DP(1)–DP(4) arrives at the second base station BS2 after a second transmission time $t_2$.

However, the difference $t_2$-$t_1$ in transmission time exceeds the duration $T_f/2$ of one half data frame. Therefore, the base station BS2 having its signals more delayed than the other, will erroneously send all the data packets DP(1)–DP(4) in data frames that are time shifted one data frame (or several, if $t_2$ is longer than the duration $T_f$ of multiple data frames) on a second downlink channel DCH2. A so called frame slip has occurred, which results in destructive combination of signals at the mobile station. I.e. the signals sent from the first base station BS1 and the signals sent from the second base station BS2 will, at the mobile station, in each given time instance contain data from different data packets, which typically contain contradictory information. Consequently, the mobile station will be unable to decode an unambiguous signal by combining the data frame packets received on the dedicated channels DCH1 and DCH2.

The frame slip problem, illustrated in FIG. 3, is solved through the present invention by generating system frame counter states SFC in each radio network control node of the cellular radio communications system. The system frame counter states SFC are preferably sent to the base stations on dedicated and separate connections, e.g. ATM-connections, in order to ensure a delay as constant as possible for these signals.

Figure 4:
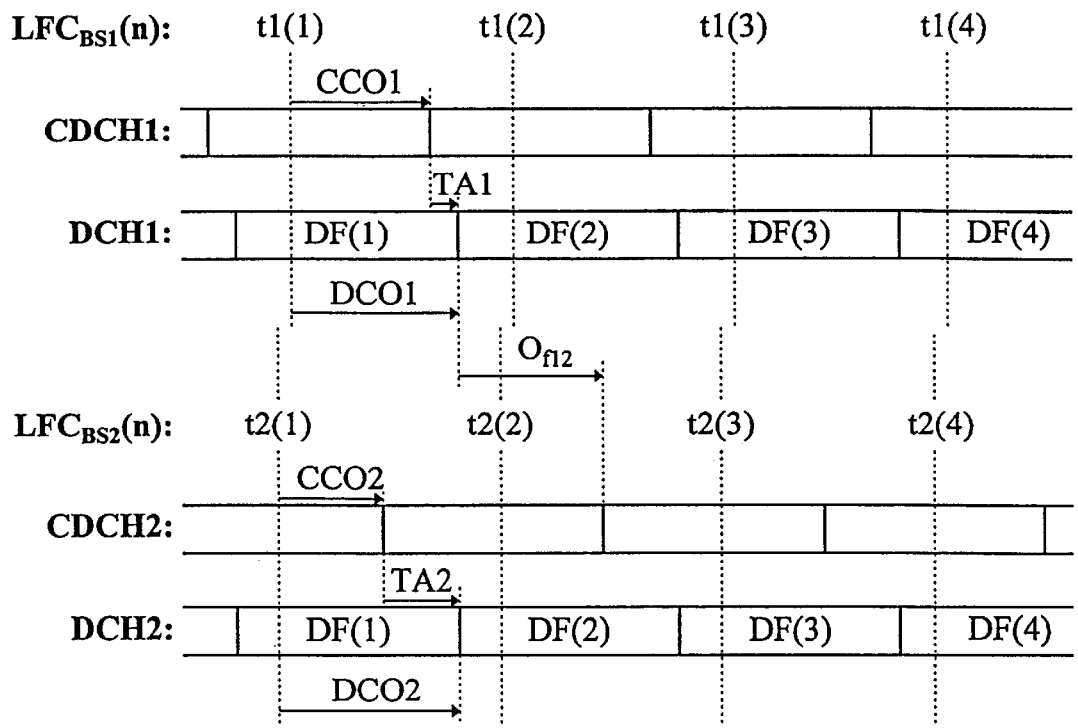
FIG. 4 illustrates a method for air interface synchronisation according to an embodiment of the invention.

FIG. 4 illustrates the timing aspects according to the invention when data packets are sent in data frames DF(1)–DF(4) from a radio network control node to a mobile station via a first sector, served by a first base station BS1, which utilise a first downlink channel DCH1, while transmission is initiated to the mobile station of data frames DF(1)–DF(4) via a second sector, served by a second base station BS2, utilising a second dedicated channel DCH2. The first and the second sectors are associated with a first CDCH1 and a second CDCH2 common downlink control channel respectively. Both base stations BS1; BS2 measure a common downlink control channel offset CCO1; CCO2 between their common downlink control channel CDCH1; CDCH2 and a respective local frame counter $LFC_{BS1}$; $LFC_{BS2}$. Each base station BS1, BS2 regularly reports its common downlink control channel offset CCO1; CCO2 to the radio network control node RNC.

In order to maintain a high synchronisation accuracy in the frame numbering the first base station BS1 regularly receives system frame counter states from the radio network control node and generates therefrom, via its local frame counter $LFC_{BS1}$, a synchronised first series of local frame counter states $LFC_{BS1}(n)$. The local frame counter state $LFC_{BS1}(n)$ is updated from the radio network control node sufficiently often to keep it less shifted from the system frame counter state SFC than a fraction of the duration $T_f$ of a data frame, e.g. one tenth of the duration $T_f$ of a data frame.

As can be seen in the FIG. 4 there is a small phase shift between the first local frame counter $LFC_{BS1}$, and the second local frame counter $LFC_{BS2}$. Nevertheless, the inventive method ensures that data frames relating to a particular connection being communicated via the base stations BS1; BS2 are always synchronised with each other.

The first downlink channel DCH1 has a first timing advance value TA1 to the first common downlink control channel CDCH1. The first timing advance value TA1 is, at connection setup, set to a value, which places the particular connection optimally in time aiming to distribute the transmission load on the network resources between the base station BS1 and the radio network control node as well as the radio interface as uniformly as possible in respect to the connections already in progress within the system.

A first downlink channel offset DCO1 is calculated as the offset CCO1 between the common downlink control channel CDCH1 in the first sector and a first local frame counter state t1(1) plus the first timing advance value TA1, i.e. DCO1= CCO1+TA1. The first downlink channel offset DCO1 is used when numbering the data frames DF(1)–DF(4). By compensating for the common downlink control channel offset CCO1; CCO2, via the downlink channel offset DCO1, an accurate frame number synchronisation with the system frame counter states SFC is achieved in the base station BS1.

In the first base station BS1 each data frame DF(1)–DF(4) is associated with a particular frame number t1(1)–t1(4) from the first series of local frame counter states $LFC_{BS1}(n)$. This frame numbering is carried out by assigning a first frame number t1(1) equal to the current local frame counter state to a first data frame DF(1), within a time equal to the first downlink channel offset DCO1 value of the current local frame counter state $LFC_{BS1}(n)$ from the first series.

Subsequent data frames DF(2)–DF(4) are numbered t1(2)–t1(4) according to their order in relation to the first data frame DF(1) by incrementing the frame number t1(2)–t1(4) once every $T_f$ seconds.

When the radio network control node has indicated that the second sector is to be included in the active set, the mobile station is instructed by the radio network control node to measure a frame offset value of $O_{f12}$ between its current downlink channel DCH1 and the second common downlink control channel CDCH2. The measured value of $O_{f12}$ is then reported to the radio network control node, which calculates a second timing advance value TA2 for the second downlink channel DCH2 as the duration $T_f$ of a data frame minus the frame offset value $O_{f12}$, i.e. TA2=$T_f$-$O_{f12}$. Subsequently, a second downlink channel offset DCO2 value is set to the common downlink control channel offset CCO2 to the second downlink channel DCH2 plus the second timing advance value TA2 plus a factor i times the duration $T_f$ of a data frame, i.e. DCO2=CCO2+TA2+i·$T_f$, where i is an integer positive, negative or equal zero, which is chosen to a value that minimises the modulus of the difference |DCO1–DCO2|$_{min}$, between the first DCO1 and the second DCO2 downlink channel offsets. Furthermore, to yet improve the synchronisation between first DCH1 and the second DCH2 downlink channel, the first downlink channel offset DCO1 value may now be re-calculated as DCO1= CCO1+TA1, i.e. the sum of the latest common downlink control channel offset CCO1 value, reported from the first base station BS1 to the radio network control node RNC1, and the timing advance TA1 value for the first downlink channel DCH1.

As the first base station BS1 receives system frame counter states from the radio network control node, so does the second base station BS2, where a synchronised second series of. local frame counter states LFC$_{BS2}$(n) is generated therefrom. Also in the second base station BS2 is each data frame DF(1)–DF(4) associated with a particular frame number t2(1)–t2(4), which is derived from the second series of local frame counter states LFC$_{BS2}$(n) . A first data frame DF(1), within a time equal to the second downlink channel offset value DCO2 of the current local frame counter state LFC$_{BS2}$(n) from the second series, is assigned a first frame number t2(1). Subsequent data frames DF(2)–DF(4) are numbered t2(2)–t2(4) according to their order in relation to the first data frame DF(1) by incrementing the frame number t2(2)–t2(4) once every $T_f$ seconds.

By setting the second downlink channel offset value DCO2 such that the modulus of the difference |DCO1–DCO2|$_{min}$, between the first DCO1 and the second DCO2 downlink channel offsets is minimised it is granted that a current data frame number t1(1) of the first downlink channel DCH1 is optimally aligned with a corresponding data frame number t2(1) of the second downlink channel DCH2. Once having synchronised the data frame numbering on the second downlink channel DCH2 with the data frame numbering on the first downlink channel DCH1 transmission of data frames DF(1)–DF(4) to the mobile station on the second downlink channel DCH2 can be started.

A corresponding synchronised numbering of data frames is, of course, performed on the base station-to-RNC connections in the uplink leg, i.e. when data packets are transmitted from a mobile station on an uplink channel, via one or more sectors and one or more base stations. Each base station then associates a frame number with each data frame that is transmitted from the base station to the radio network control node on the uplink leg, which is equal to the frame number of a corresponding downlink channel for that particular connection.

A buffer unit in the radio network control node stores copies of the received data packets and performs a diversity procedure on data packets having been transmitted in data frames with identical numbering. The exact measures taken during this procedure will be described in further detail later in the disclosure, in particular with reference to the FIGS. 7 and 8.

Figure 5:
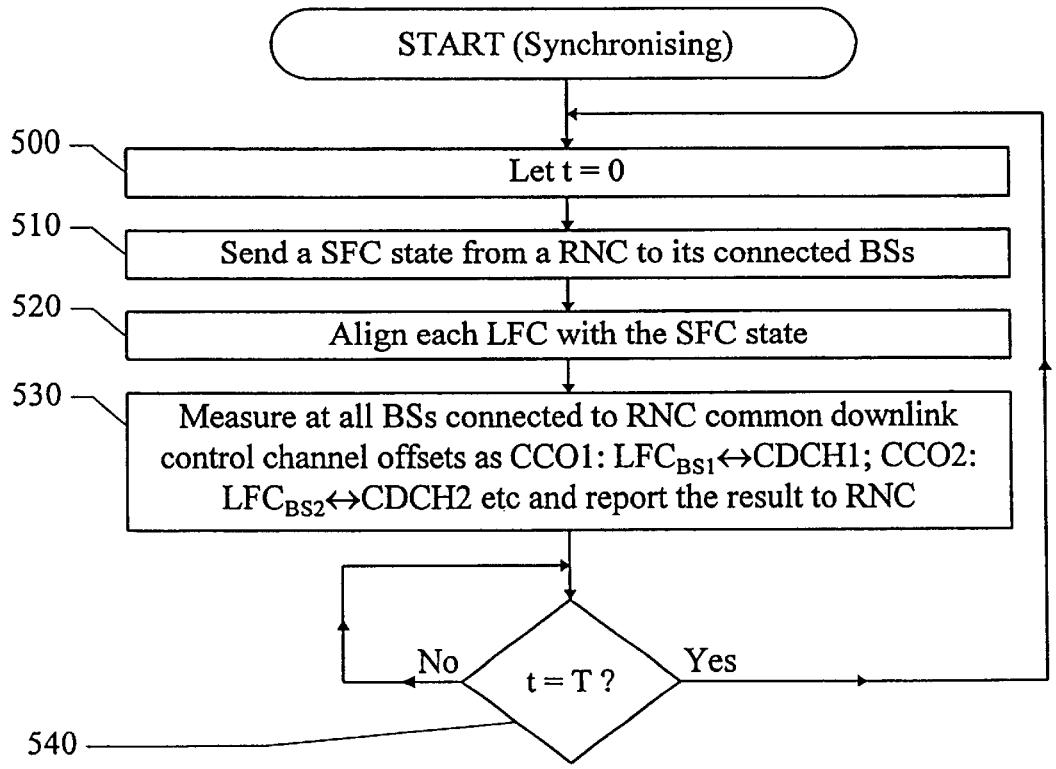
FIG. 5 shows flow diagram over the inventive method for synchronising asynchronous base stations.

In FIG. 5 is shown a flow diagram over the inventive method for synchronising all asynchronous base stations, which are connected to a specific central node. In a first step 500 is a timer variable t set to zero. A current system frame counter state SFC is sent from the central node RNC to all its connected base stations BSs in a second step 510. In a following step 520 is the local frame counter state LFC in each of the base stations aligned with the system frame counter state SFC. Every base station connected to the central node RNC measures in the next step 530 a respective common downlink control channel offset CCO1 between its local frame counter state LFC$_{BS1}$; LFC$_{BS2}$ and its common downlink control channel CDCH1; CDCH2. The results of the measurements are reported to the central node RNC, where downlink channel offsets are calculated. Then, in step 540, is tested whether the timer variable t equals a predetermined value T, and if so, the flow returns to the first step 500. Otherwise the flow stays in step 540 until the timer variable t is equal to the predetermined value T. Hence, the predetermined value T settles the frequency at which the local frame counter states LFC shall be updated from the system frame counter state SFC.

Figure 6:
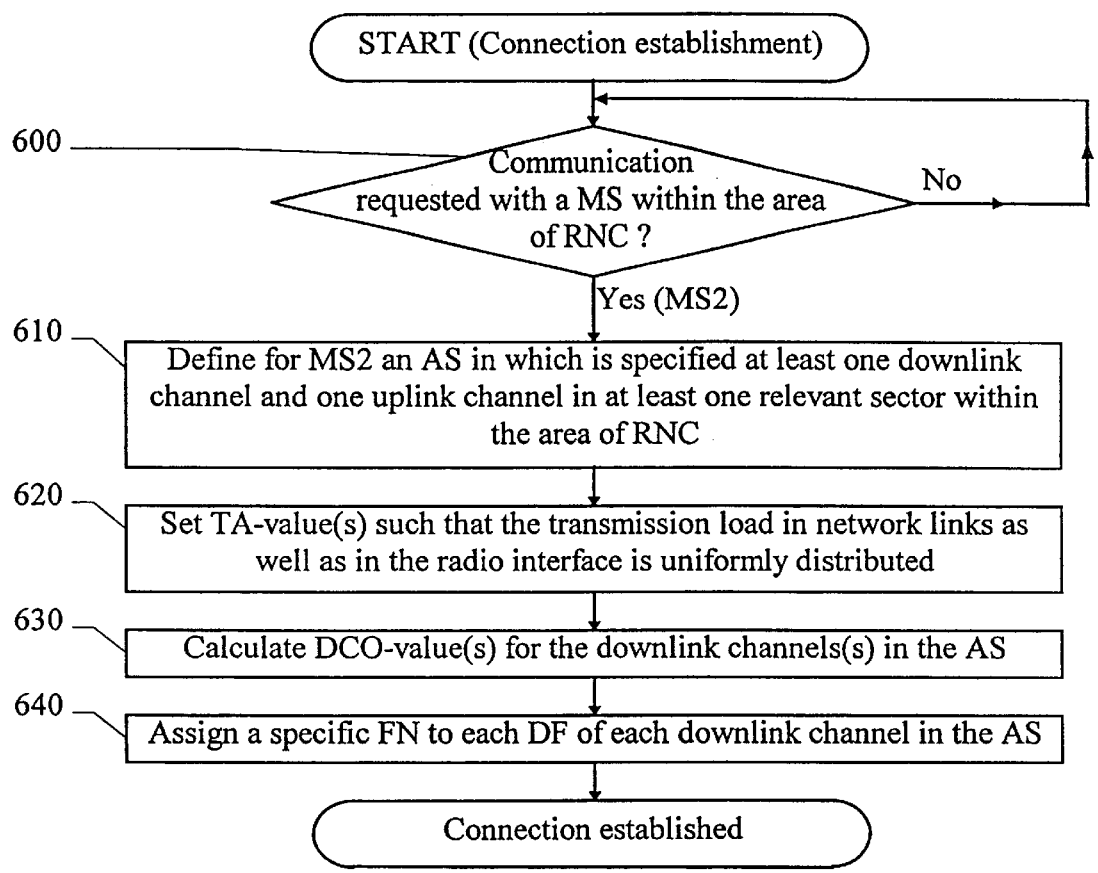
FIG. 6 shows flow diagram over an embodiment of the inventive method for establishing a connection in a cellular radio communications system.

FIG. 6 shows flow diagram over an embodiment of the inventive method for establishing a connection between the stationary part of the cellular radio communications system and a particular mobile station MS2. In a first step 600 is inquired whether communication is requested with a mobile station within the area of responsibility for a certain central node RNC, and if that is the case the flow continues to the following step 610. Otherwise the flow returns to the first step 600 again. An active set AS is defined for the mobile station MS2 in step 610. The active set specifies at least one uplink and one downlink channel for the mobile station MS2 within at least one sector, which is served by a base station being connected to the central node RNC. In the next step 620 is a timing advance TA value set for the downlink channel(s), which gives the most uniform time distribution of the network and channel resources, when the connections already in progress within the system are taken into consideration. In the step 630 thereafter is for each downlink channel in the active set AS calculated a downlink channel offset DCO value as the sum of the common control channel offset CCO and the timing advance value TA. Finally, in step 640 is a specific frame number FN assigned to each data frame DF on the downlink channel(s) as follows. An initial data frame DF, starting the downlink channel offset DCO value after the current local frame counter state is allocated a frame number equal to the following state of the local frame counter of the base station, which serves the sector in question. The subsequent data frames DF are allocated frame numbers FN according to their order in relation to the initial data frame DF by incrementing the frame number once every $T_f$ seconds.

Figure 7:
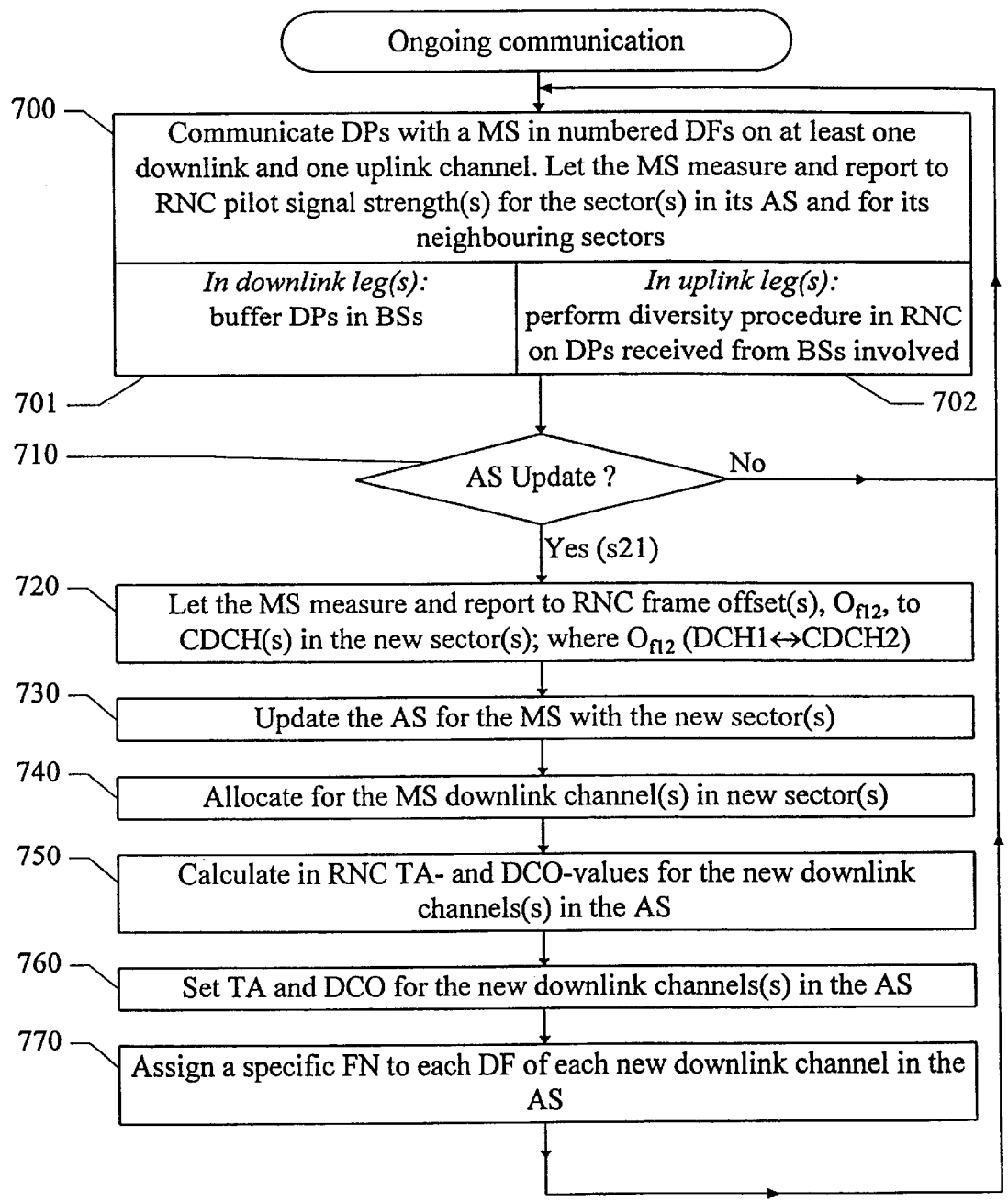
FIG. 7 shows flow diagram over an embodiment of the inventive method for starting communication via a second sector while communicating via a first sector in a cellular radio communications system.

A flow diagram over an embodiment of the inventive method for starting communication with a mobile station via a second sector, which is already communicating information via a first sector is shown in FIG. 7. Such initiation of communication via an additional sector is equivalent to adding a new sector to a non-empty active set for the mobile station MS. In a first step 700 is a mobile station MS (e.g.

the second mobile station MS2 in FIG. 1) communicating data packets DPs in numbered data frames DFs, via at least one downlink and one uplink downlink channel. The mobile station MS regularly measures pilot signal strengths for sectors specified in the active set AS and for neighbouring sector and reports the results to the central node RNC (e.g. the first radio network control node RNC1 in FIG. 1). In the downlink legs of the connection are data packets DPs buffered in the serving base station(s), until the data packets DPs can be sent to the mobile station MS on a downlink channel in a data frame having a frame number indicated by the radio network control node RNC1, and in the uplink legs of the connection are data packets DPs buffered in the central node RNC, whereafter a diversity procedure is performed on data packets DPs coming in data frames DFs with identical frame numbers. The buffer limit in the base station(s) is dependent on the downlink channel DCO value and a transmission timing from the radio network control node RNC1 for the downlink channel(s). A data packet DP, which arrives too late to be sent in a data frame DF, indicated by the radio network control node RNC1, is discarded in the base station. A similar buffer restriction exists for the uplink channels in the central node RNC. The central node performs the diversity procedure either when all copies of a particular data packet DP has arrived, or after a predetermined time τ. The predetermined time τ may be settled by a number of different factors such as a maximally allowable delay in the system, the characteristics of ATM links used or the frame synchronisation procedure. The diversity procedure in its turn is carried out according to one of two principles. Either it implicates selecting the data packet DP with the highest quality or it means combining signal energies from all received copies of a data packet DP. The expiration of the predetermined time τ may, of course, forces the central node to perform macro diversity on less than all copies of a data packet DP.

In a step 710 is at regular intervals investigated whether or not the active set AS should be updated, and if not, the flow returns to the first step 700. If however, the active set is to be updated (like for instance by adding the sector s21 to the active set for the second mobile station MS2 in FIG. 1) the step 720 follows. In this step the mobile station MS is instructed to measure a frame offset value $O_{f12}$ between a downlink channel currently specified in the active set AS (e.g. DCH1) and the common downlink control channel for the ASU candidate sector (e.g. CDCH2). The frame offset value $O_{f12}$ is reported to the central node RNC. The active set AS is then updated with the new sector(s) in the next step 730 and in the following step 740 is a downlink channel allocated in the new sector for transmission of information to the mobile station MS. In the next step 750 is calculated in the central node RNC a timing advance value TA for the new downlink channel as the duration of a data frame $T_f$ minus the frame offset value $O_{f12}$. The central node RNC also calculates a downlink channel offset DCO for the new downlink channel (i.e. how data frames DF of the new downlink channel shall be numbered relative to the local frame counter states in the base station, which serves the new sector) as (1) the common downlink control channel offset between a series of local frame counter states in the base station, serving the second sector and the common downlink control channel in this sector plus (2) the timing advance value for the new downlink channel plus (3) an integer times the duration $T_f$ of a data frame DF, where the integer is set to a value (positive, negative or zero) that minimises the modulus of the difference between the downlink channel offset of the channel DCO1 in the active set AS and the downlink channel offset of the channel DCO2 to be included in the active set AS (i.e. $|DCO1-DCO2|_{min}$).

The calculated timing advance TA value and the downlink channel offset DCO are set for the new channel in the active set AS in the following step 760 and in the last step 770 is a specific frame number FN, assigned to each data frame DF of the new downlink channel, by giving an initial data frame DF on the new downlink channel within half the duration $T_f$ of a data frame DF, starting from the downlink channel offset value DCO after a current local frame counter state, an initial frame number FN equal to the following local frame counter state. Each subsequent data frame DF is allocated an integer incrementation of this initial frame number FN equal to the order of each respective data frame DF in relation to the initial data frame DF. The procedure then returns to the first step 700.

Figure 8:
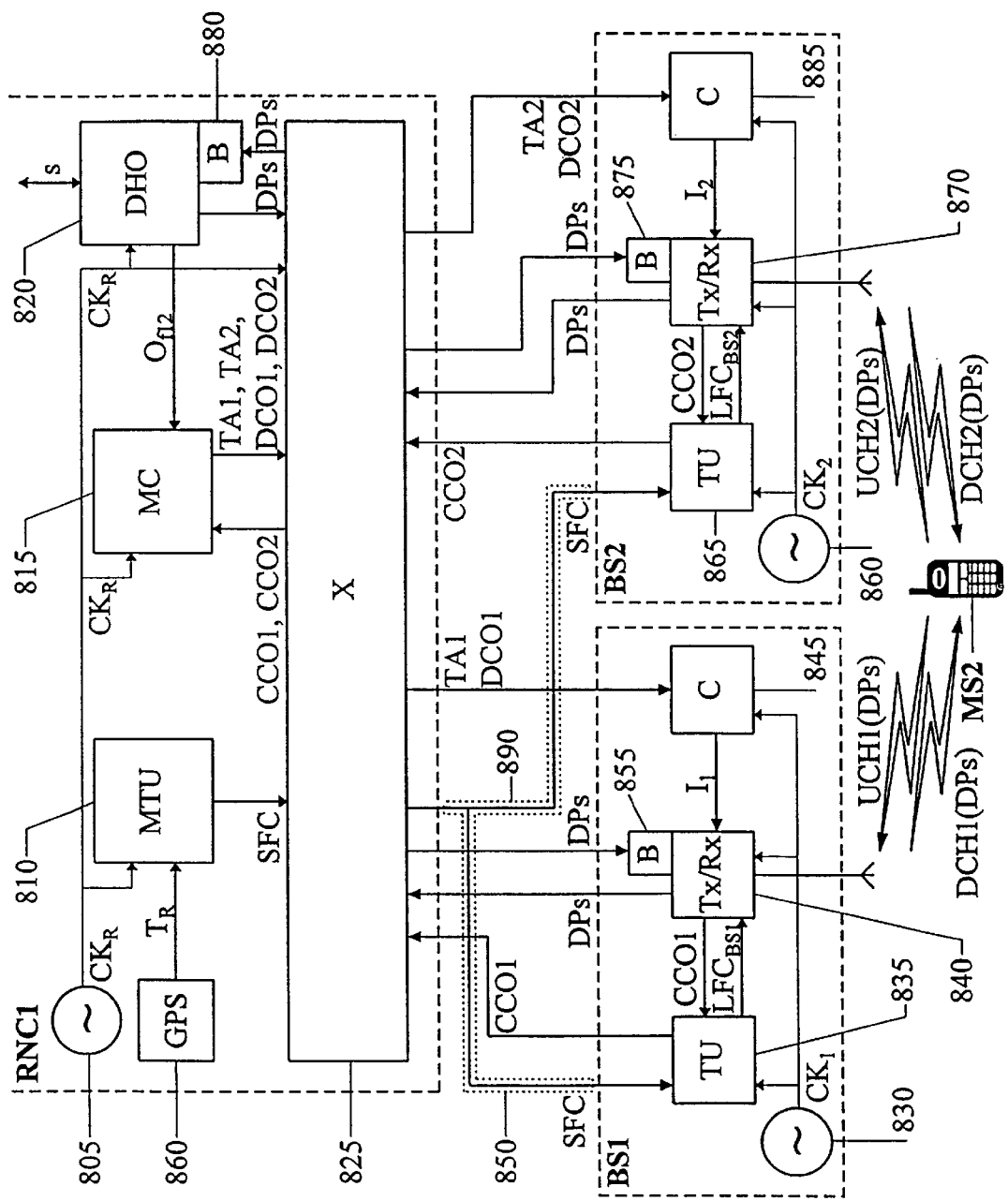
FIG. 8 shows an arrangement according to an embodiment of the invention.

An arrangement according to an embodiment of the invention for communicating framed information in a cellular radio communications system is depicted in a block diagram in FIG. 8.

A central node in form of a radio network control node RNC1 is here connected to a first BS1 and a second BS2 base station, via for instance ATM connections. The radio network control node RNC1 comprises a clock unit 805, which generates a reference clock signal $CK_R$ that synchronises all other units within the node RNC1. The clock unit 805 is in its turn triggered by a time reference signal $T_R$ from a reference time generator 860, which is a GPS-receiver or a similar device for indicating the time having sufficient accuracy. A master timing unit 810 in the node RNC1 generates system frame counter states SFC, which are sent via dedicated and separate connections 850; 890 as a frame number references to the base stations BS1 and BS2. The base stations BS1; BS2 each includes a clock unit 830; 860 for synchronising all other units within the base station BS1; BS2, through a clock signal $CK_1$; $CK_2$. Each base station BS1; BS2 also comprises a timing unit 835; 865 from which a first series of local frame counter states $LFC_{BS1}$ and a second series of local frame counter states $LFC_{BS2}$ is generated respectively to a transceiver unit 840; 870.

In order to estimate a one-way delay $D_1$; $D_2$ experienced by the data packets DPs, when being communicated between the central node RNC1 and the base stations BS1 and BS2 respectively, a round-trip-delay message $RTD_1$; $RTD_2$ is looped back and forth between the central node RNC1 and each specific base station BS1; BS2. An estimate of the one-way delay $D_1$; $D_2$ is then calculated by subtracting a an arrival time $t_a$ of the roundrip-delay message $RTD_1$; $RTD_2$ from a corresponding sending time of the message $RTD_1$; $RTD_2$ and dividing the result by two, i.e. $D_1=(t_{a1}-t_{s1})/2$; $D_1=(t_{a2}-t_{s2})/2$. In order to obtain a more reliable estimate of the one-way delay $D_1$; $D_2$ a number p (where e.g. p=10) such calculations are performed from which an average one-way delay $D_1$; $D_2$ is computed. Naturally, there are alternative ways of filtering may be applied in order to estimate the one-way delay $D_1$; $D_2$. The round-trip-delay message $RTD_1$; $RTD_2$ can also be combined with or included in a system frame counter SFC message from the central node RNC1.

The round-trip-delay message $RTD_1$; $RTD_2$ may either be originated from the base station BS1; BS2 or from the central node RNC1. If round-trip-delay message $RTD_1$; $RTD_2$ is sent from one of the base stations BS1, BS2 compensation for the one-way delay is also performed in the base station BS1; BS2, by adjusting the local frame counter state $LFC_{BS1}$; $LFC_{BS2}$ according to the system frame counter state SFC plus the one-way delay $D_1$; $D_2$ i.e. $LFC_{BS1}$=SFC+$D_1$; $LFC_{BS2}$=SFC+$D_2$. If, instead, the round-trip-delay message $RTD_1$; $RTD_2$ is originated from the central node RNC1, the one-way delay $D_1$; $D_2$ is compensated for in this node, by bringing forward in time the transmission of each system frame counter state SFC message $SFC_1$; $SFC_2$ to each respective base station BS1; BS2 a time equal to the estimated one-way delay $D_1$; $D_2$, i.e. such that $SFC_1$=SFC−$D_1$; $SFC_2$=SFC−$D_2$.

A master control unit 815 is used for calculating timing advance values TA1; TA2 and downlink channel offset values DCO1; DCO2 to be used in the base stations BS1; BS2 while communicating data packets DPs in numbered data frames on the downlink channels DCH1(DPs); DCH2 (DPs). However, the master control unit 815 also determines when to update the active set for a particular mobile station MS2 by either adding or dropping one or more sectors from the active set. A diversity handover unit 820 handles the communication of information during handover procedures as well as during normal communication, i.e. sends and receives data packets DPs.

In case of real time speech being communicated with the mobile station MS2, information s is received from the central parts of the network via a speech codec (coder/decoder) and sent to the central parts of the network via the same speech codec. If, other kinds of data is communicated the information s either passes through an alternative codec or is communicated uncoded. Split-up information in form of data packets DPs is delivered from the diversity handover unit 820 over a switching unit 825 to the base stations BS1; BS2 and data packets from the base stations BS1; BS2 are passed on to the diversity handover unit 820 via the switching unit. 825 and a buffer unit 880. The buffer unit 880 is utilised when performing a diversity procedure on copies of received data packets DPs. The buffer unit 880 stores data packets DPs up to a predetermined time, which is determined by e.g. a maximally allowable delay in the system, the characteristics of ATM links used between the radio network control node RNC1 and the base stations BS1; BS2. After the expiration of the predetermined time the diversity procedure is performed on the currently available copies of a particular data packet DP. The diversity handover unit 820 also receives frame offset values $O_{f12}$, which are included in the data packets DPs and reported from the mobile station MS2, via one of the base stations BS1. The frame offset values $O_{f12}$, are passed on to the master control unit 815 as an input for calculating the timing advance values TA2.

The transceiver unit 840; 870 in the base station BS1; BS2 receives data packets DPs from the mobile station MS2 on an uplink channel UCH1(DPs); UCH2(DPs) and transmits data packets DPs to the mobile station MS2 on a downlink channel DCH1; DCH2. The data packets DPs are sent to the radio network control node RNC1 via the switching unit 825 and data packets DPs are received from the radio network control node RNC1 via the switching unit 825 and a buffer unit 855; 875. The buffer unit 855; 875 stores the data packets DPs until a data packet DP can be sent to the mobile station MS2 from the first BS1 and the second BS2 base station on a downlink channel DCH1; DCH2 in a data frame having a frame number indicated by the radio network control node RNC1. A data packet DP, which arrives too late to a particular base station BS1; BS2 to meet this requirement is discarded. Furthermore, the transceiver unit 840; 870 measures a common downlink control channel offset CCO1; CCO2 between its local frame counter state $LFC_{BS1}$; $LFC_{BS2}$ and its common downlink control channel CDCH1; CDCH2. The results of the measurements are reported to the master control unit 815 in the central node RNC1, via the timing unit 835; 865 and the switching unit 825.

A timing control unit 845; 885 in each base station BS1; BS2 receives the timing advance value TA1; TA2 and the downlink channel offset value DCO1; DCO2 from the master control unit 815 in the central node RNC1, via the switching unit 825. The timing control unit 845; 885 regulates the operation of the transceiver unit 840; 870 via a control signal $I_1$, $I_2$, so that each data packet DP received and transmitted via the air interface is associated with a correct frame number.

The invention is primarily intended to be used in a CDMA cellular radio communications system, but the inventive method and arrangement are, of course, applicable in any kind of cellular radio communications system regardless of how the radio resources are divided between the individual users of the system. The common downlink control channels, the downlink channels and uplink channels may hence be distinguished from each other through code division, a combination of code and frequency division, a combination of code and time division, or a combination of code, frequency and time division of the radio spectrum.

What is claimed is:

1. A method in a cellular radio communications system, which is arranged for communicating information in data frames (DF) of a predetermined duration ($T_f$) the system comprising at least one central node (RNC1, RNC2) and at least one asynchronous base station (BS1–BS5), for synchronizing all base stations (BS1, BS2) that are connected to one (RNC1) of the at least one central node (RNC1, RNC2) independently of any global time reference for the system, the method comprising the steps of:

sending a system frame counter state (SFC) from the central node (RNC1) to all its connected base stations (BS1, BS2), the frame counter state being incremented one step for each of the data frames (DF); and aligning in each of the connected base stations (BS1, BS2) a state of a respective local frame counter ($LFC_{BS1}$, $LFC_{BS2}$) with the system frame counter state (SFC);

wherein each of the data frames (DF) is associated with a specific frame number (t1(1)–t1(4), t2(1)–t2(4)) which is derived from the respective local frame counter ($LFC_{BS1}$, $LFC_{BS2}$).

2. The method according to claim 1, wherein the system frame counter state (SFC) is incremented one step after each lapse of one of the data frames (DF) and wherein each of the base stations (BS1–BS5) has at its disposal at least one common downlink control channel (CDCH1, CDCH2), the method further comprising the steps of:

in each of the connected base stations (BS1, BS2), measuring a common downlink control channel offset value (CCO1, CCO2) between the local frame counter states ($LFC_{BS1}$, $LFC_{BS2}$) and a corresponding common downlink control channel (CDCH1, CDCH2), where the local frame counter state ($LFC_{BS1}$, $LFC_{BS2}$) is incremented at a rate correlated to the system frame counter (SFC) step rate; and reporting the common downlink control channel offset values (CCO1, CCO2) to the central node (RNC1).

3. The method according to claim 1, wherein an update of the system frame counter state (SFC) is sent out at regular time intervals (T).

4. The method according to claim 1, wherein a one-way delay ($D_1$, $D_2$) is determined for each connection between the central node (RNC1) and all its connected base stations (BS1, BS2), and that the one-way delay ($D_1$, $D_2$) is compensated for.

5. The method according to claim 4, wherein the one-way delay ($D_1$, $D_2$) is calculated through a procedure comprising the consecutive steps of:
sending a round-trip-delay message ($RTD_1$) back and forth between the central node (RNC1) and a given base station (BS1);
calculating a difference between an arrival time ($t_a$) and a corresponding sending time ($t_s$) of the round-trip-delay message ($RTD_1$) and dividing the calculated difference by two;
repeating the steps of sending the round-trip-delay message ($RTD_1$) and calculating the difference a predetermined number of times to produce (p) differences; and
averaging over the (p) differences.

6. The method according to claim 5, wherein the round-trip-delay message ($RTD_1$) is originated from a base station (BS1, BS2).

7. The method according to claim 6, wherein the one-way delay ($D_1$, $D_2$) is compensated for in each of the connected base stations (BS1, BS2) by adjusting the local frame counter state according to the equation:

$$LFC_{BSx} = SFC + D_x$$

where
$LFC_{BSx}$ denotes a respective one of the local frame counter states $LFC_{BS1}$, and $LFC_{BS2}$, whose resolution is a fraction of a step
SFC denotes the system frame counter state; and
$D_x$ denotes the one-way delay $D_1$ or $D_2$.

8. The method according to claim 5, wherein the round-trip-delay message ($RTD_1$) originates from the central node (RNC1).

9. The method according to claim 8, wherein the one-way delay ($D_1$, $D_2$) is compensated for in the central node (RNC1) by bringing forward in time the transmission of each system frame counter state ($SFC_x$) message to the connected base stations (BS1, BS2) according to the equation:

$$SFC_x = SFC - D_x$$

where
$SFC_x$ denotes a system frame counter message sent to a particular base station (X=1: BS1, X=2: BS2),
SFC denotes the system frame counter state and
$D_x$ denotes the one-way delay $D_1$ or $D_2$.

10. The method according to claim 1, wherein the at least one central node (RNC1, RNC2) is a radio network control node.

11. The method according to claim 2, wherein the at least one common downlink control channel (CDCH1, CDCH2), downlink channels (DCH1, DCH2) and uplink channel(s) (UCH2) are distinguished from each other through either
(A) a code division of a radio spectrum,
(B) a code and frequency division of the radio spectrum,
(C) a code and time division of the radio spectrum, or
(D) a combination of code, frequency and time division of the radio spectrum.

12. A method in a cellular radio communications system comprising at least one central node (RNC1, RNC2), which is connected to at least one asynchronous base station (BS1–BS5), each of which serves at least one geographical sector (s11–s56), which in turn are each associated with a common downlink control channel (CDCH1, CDCH2), where the base stations (BS1–BS5) communicate information with mobile stations (MS1–MS4), the information being divided into data packets (DP), which are transmitted in data frames (DF)
on downlink channels (DCH1, DCH2) via one or more sectors (s23, s24) to the mobile stations (MS1–MS4), and
on uplink channels (UCH2) from the mobile stations (MS1–MS4) via one or more sectors (s23, s24),
for establishing a connection between one of the mobile stations (MS2) and at least one base station (BS1), the method comprising the steps of:
sending a system frame counter state (SFC) from one central node (RNC1) of the at least one central node (RNC1, RNC2) to all its connected base stations (BS1, BS2), the frame counter state being incremented one step for each of the data frames (DF) and being incremented one step after each lapse of one of the data frames (DF);
aligning in each of the connected base stations (BS1, BS2) a state of a respective local frame counter ($LFC_{BS1}$–$LFC_{BS2}$) with the system frame counter state (SFC), each of the data frames (DF) being associated with a specific frame number (t1(1)–t1(4), t2(1)–t2(4)) which is derived from the respective local frame counter ($LFC_{BS1}$–$LFC_{BS2}$);
in each of the connected base stations (BS1, BS2), measuring a common downlink control channel offset value (CCO1, CCO2) between the local frame counter states ($LFC_{BS1}$–$LFC_{BS2}$) and a corresponding common downlink control channel (CDCH1, CDCH2), where the local frame counter state ($LFC_{BS1}$–$LFC_{BS2}$) is incremented at a rate correlated to the system frame counter (SFC) step rate;
reporting the common downlink control channel offset values (CCO1, CCO2) to the at least one central node (RNC1, RNC2);
defining for the mobile station (MS2) an active set (AS) in which at least one of the downlink channels (DCH1) and one of the uplink channels (UCH2) is specified;
for each of the at least one downlink channels (DCH1) in the active set (AS), setting a timing advance value (TA1), which indicates an offset between the common downlink control channel (CDCH1) and the downlink channel (DCH1);
for each of the at least one downlink channels (DCH1) in the active set (AS), calculating a downlink channel offset (DCO1) as a sum (CCO1+TA1) of a common downlink control channel offset (CCO1) and the timing advance value (TA1);
assigning a specific frame number (t1(1)–t1(4)) to each data frame (DF(1)–DF(4)) on each of the at least one downlink channels (DCH1), by giving an initial data frame (DF(1)) a first number (t1(1)) and each following data frame (DF(2)–DF(4)) an integer incrementation (t1(2), t1(3), t1(4)) of this number (t1(1)) equal to an order of each respective data frame (DF(2)–DF(4)) in relation to the initial data frame (DF(1)).

13. The method according to claim 12, wherein during downlink communication of information, data packets (DP) are buffered (B) in each of the connected base stations (BS1, BS2) until the frame number for the data frames transmitting each specific data packet (DP(1)–DP(4)) matches the frame number (t1(1)–t1(4), t2(1)–t2(4)) on the respective downlink channel (DCH1, DCH2).

14. The method according to claim 13, wherein the buffering (B) holds data packets (DP) up to a maximum number and that a data packet (DP) is discarded if it arrives at one of the connected base stations (BS1, BS2) too late to meet the frame number on the respective downlink channel (DCH1; DCH2) indicated by the central node (RNC1).

15. The method according to claim 12, wherein during uplink communication of information, data packets (DP) are received in the connected base stations (BS1, BS2) in data frames (DF), being numbered (t1(1)–t1(4), t2(1)–t2(4)) in relation to the frame numbering of the downlink channels (DCH1, DCH2) indicated by the central node (RNC1) and that a diversity procedure is performed in the central node (RNC1) on data packets (DP), which are sent in data frames (DF) having identical numbers.

16. The method according to claim 15, wherein the diversity procedure is performed when all copies of a given data packet (DP) have arrived at the central node (RNC1), but no later than a time ($\tau$) after arrival of a first copy of the data packet (DP).

17. The method according to claim 16, wherein, in the diversity procedure, one data packet (DP) having a highest quality is selected to represent the communication of information.

18. The method according to claim 16, wherein, in the diversity procedure, contents of all data packets (DP) are combined to form a representation of the communication of information.

19. A method in a cellular radio communications system comprising at least one central node (RNC1, RNC2), which is connected to at least one asynchronous base station (BS1–BS5), each of which serves at least one geographical sector (s11–s56), which in turn are each associated with a common downlink control channel (CDCH1, CDCH2), where the base stations (BS1–BS5) communicate information with mobile stations (MS1–MS4), the information being divided into data packets (DP), which are transmitted in data frames (DF)
on downlink channels (DCH1, DCH2) via one or more sectors (s23, s24) to the mobile stations (MS1–MS4), and
on uplink channels (UCH2) from the mobile stations (MS1–MS4) via one or more sectors (s23, s24), for commencing communication via at least one second sector (s21) with one of the mobile stations (MS2) which is already communicating information via at least one first sector (s14) specified in an active set (AS) for the mobile station (MS2), the method comprising the steps of:

sending a system frame counter state (SFC) from one central node (RNC1) of the at least one central node (RNC1, RNC2) to all its connected base stations (BS1, BS2), the frame counter state being incremented one step for each of the data frames (DF) and being incremented one step after each lapse of one of the data frames (DF);

aligning in each of the connected base stations (BS1, BS2) a state of a respective local frame counter ($LFC_{BS1}$–$LFC_{BS2}$) with the system frame counter state (SFC), each of the data frames (DF) being associated with a specific frame number (t1(1)–t1(4), t2(1)–t2(4)) which is derived from the respective local frame counter ($LFC_{BS1}$–$LFC_{BS2}$);

in each of the connected base stations (BS1, BS2), measuring a common downlink control channel offset value (CCO1, CCO2) between the local frame counter states ($LFC_{BS1}$–$LFC_{BS2}$) and a corresponding common downlink control channel (CDCH1, CDCH2), where the local frame counter state ($LFC_{BS1}$–$LFC_{BS2}$) is incremented at a rate correlated to the system frame counter (SFC) step rate;

reporting the common downlink control channel offset values (CCO1, CCO2) to the at least one central node (RNC1, RNC2);

measuring at least one frame offset value ($O_{f12}$) between a downlink channel (DCH1) in the active set (AS) and a second common downlink control channel (CDCH2), associated with the second sector (s21), not included in the active set (AS), reporting the frame offset value ($O_{f12}$) to a central node (RNC1), updating the active set (AS) by adding thereto the second sector (s21), calculating a timing advance value (TA2) and a downlink channel offset value (DCO2) for at least one second downlink channel (DCH2) in the second sector (s21), setting an offset between data frames (DFs) transmitted on the at least one second downlink channel (DCH2) and the second common downlink control channel (CDCH2) equal to the timing advance value (TA2), assigning a specific frame number (t2(1)–t2(4)) to each data frame (DF(1)–DF($_4$)) on the second downlink channel (DCH2), by giving an initial data frame (DF (1)) after a current local frame counter state from the second series of local frame counter states ($LFC_{BS2}(n)$) a frame number (t2(1)) equal to a following local frame counter state from this series and each subsequent data frame (DF(2)–DF(4)) an integer incrementation (t2(2) –t2(4)) of this frame number (t2(1)) equal to the order of each respective data frame (DF(2)–DF(4)) in relation to the initial data frame (DF(1)).

20. The method according to claim 19, wherein the step of calculating is carried out according to the equation:

$$TA2 = T_f - O_{f12}$$

where
TA2 denotes the timing advance value,
$T_f$ denotes the duration of a data frame (DF), and
$O_{f12}$ denotes the frame offset value;
and $$DCO2 = CCO2 + TA2 + i \cdot T_f$$

where
DCO2 denotes a downlink channel offset for the at least one second downlink channel (DCH2) representing how data frames (DF) of the at least one second downlink channel (DCH2) are numbered (t2(1)–t2(4)) relative to the local frame counter states ($LFC_{BS2}(n)$) in the second sector (s21),
CCO2 denotes the common downlink control channel offset value between the second series of local frame counter states ($LFC_{BS2}(n)$) and the common downlink control channel (CDCH2),
TA2 denotes the timing advance value, is an integer, which is set to a value that minimizes the modulus of the difference ($|DCO1-DCO2|_{min}$), between the frame number (t1) given by the first downlink channel offset (DCO1) and the frame number (t2) given by the second downlink channel offset (DCO2), and
$T_f$ denotes the duration of a data frame (DF).

21. The method according to claim 20, wherein the downlink channel offset (DCO1) for the first downlink channel (DCH1) is re-calculated according to the equation:

$$DCO1 = CCO1 + TA1$$

where

CCO1 is the latest common downlink control channel offset value between the first series of local frame counter states ($LFC_{BS1}$ (n)) and the first common downlink control channel (CDCH1) reported from the first base station (BS1) to the central node (RNC1), TA1 is equal to the timing advance value for the first downlink channel (DCH1).

22. An arrangement for communicating framed information in a cellular radio communications system comprising at least one central node (RNC1), which is connected to at least one asynchronous base station (BS1, BS2) through which data packets (DPs) are communicated on downlink channels (DCH1, DCH2) and uplink channels (UCH1, UCH2) with mobile stations (MS2) and where control signals are transmitted on common downlink control channels (CDCH1, CDCH2) to the mobile stations (MS2), wherein the at least one central node (RNCL) comprises a master timing unit for generating system frame counter states (SFC) to be sent to the at least one base station (BS1, BS2), a master control unit for calculating timing advance values (TA) and downlink channel offset values (DCO1, DCO2) to be used while communicating data packets (DPs) in numbered data frames (DF) on the downlink channels (DCH1, DCH2), a diversity handover unit for executing simultaneous communication via more than one of the at least one base station (BS1, BS2) with a particular mobile station (MS2).

23. The arrangement according to claim 22, wherein the at least one central node (RNC1) further comprises a clock generator for synchronizing all other units included in the at least one central node (RNC1), a reference time generator providing an absolute time reference ($T_R$) to be used by the master timing unit and a switching unit for alternately connecting the diversity handover unit to one specific base station of the at least one base station (BS1, BS2).

24. The arrangement according to claim 23, wherein the reference time generator is a GPS receiver.

25. The arrangement according to claim 22, wherein each of the base stations (BS1, BS2) comprises:

a clock generator for synchronizing all other units in the base station (BS1, BS2);

a timing unit for receiving the system frame counter states (SFC) and generating local frame counter states ($LFC_{BS1}$, $LFC_{BS2}$);

a transceiver unit for communicating data packets (DPs) in numbered data frames (DF) and for measuring offset values (CCO1, CCO2) between the local frame counter states ($LFC_{BS1}$, $LFC_{BS2}$) and the common downlink control channels (CDCH1, CDCH2); and a timing control unit for receiving the timing advance values (TA1, TA2) and the downlink channel offset values (DCO1, DCO2) and for controlling ($I_1$, $I_2$) the transceiver unit.

26. The arrangement according to claim 22, wherein at least one particular and one separate connection is dedicated for transmitting the system frame counter states (SFC) from the at least one central node (RNC1) to each of the base stations (BS1, BS2).

27. The arrangement according to claim 26, wherein each of the particular and separate connections is compensated for a one-way delay ($D_1$, $D_2$) between the at least one central node (RNC1) and each respective base station (BS1, BS2).

28. The arrangement according to claim 25, wherein each of the base stations (BS1, BS2) further comprises a first buffer unit for buffering data packets (DPs) which have been transmitted from the at least one central node (RNC1).

29. The arrangement according to claim 28, wherein an output of the first buffer unit is connected to the transceiver unit.

30. The arrangement according to claim 22, wherein the at least one central node (RNC1) further comprises a second buffer unit for buffering data packets (DPs), which have been transmitted from the base stations (BS1, BS2).

31. The arrangement according to claim 30, wherein an output of the second buffer unit is connected to the diversity handover unit.

32. The arrangement according to claim 22, herein each base station includes a timing unit to receive the system frame counter states (SFC) and to create local frame counter states ($LFC_{BS1}$, $LFC_{BS2}$), the system frame counter states (SFC) being incremented one step for each data frame (DF) and where each of said data frames (DF) being associated with a specific frame number (t1(1)–t1(4), t2(1)–2(4)) is derived from a respective local frame counter ($LFC_{BS1}$, $LFC_{BS2}$).

* * * * *